United States Patent [19]
Ciaffone

[11] 3,844,945
[45] Oct. 29, 1974

[54] MOVEMENT OF ALUM SLUDGE
[75] Inventor: Charles P. Ciaffone, Sturbridge, Mass.
[73] Assignee: CPC Engineering Corporation, Sturbridge, Mass.
[22] Filed: Aug. 27, 1973
[21] Appl. No.: 391,620

[52] U.S. Cl.................. 210/73, 210/83, 210/104, 210/322
[51] Int. Cl............................................ B01d 21/24
[58] Field of Search ....... 210/73, 83, 103, 104, 112, 210/322

[56] References Cited
UNITED STATES PATENTS
3,679,053  7/1972  Koulovatos et al............ 210/104 X
3,721,344  3/1973  Rost.................................. 210/104
3,749,243  7/1973  Brown............................... 210/104

Primary Examiner—John Adee
Attorney, Agent, or Firm—Thomas B. Graham

[57] ABSTRACT

Apparatus for moving alum sludge which comprises a device for collecting alum sludge from the bottom of a settling tank, moving the aqueous sludge to a pneumatic collector, closing off the collector, and pneumatically moving the sludge to a discharge pipe, and conducting the operation in tandem with a second, with appropriate means for interconnection of the two units, to permit discharge from one while the other is being filled with sludge.

5 Claims, 4 Drawing Figures

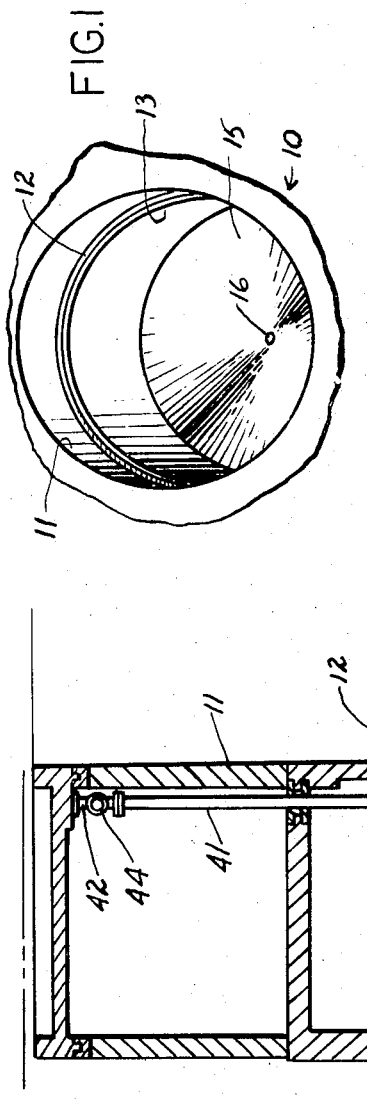
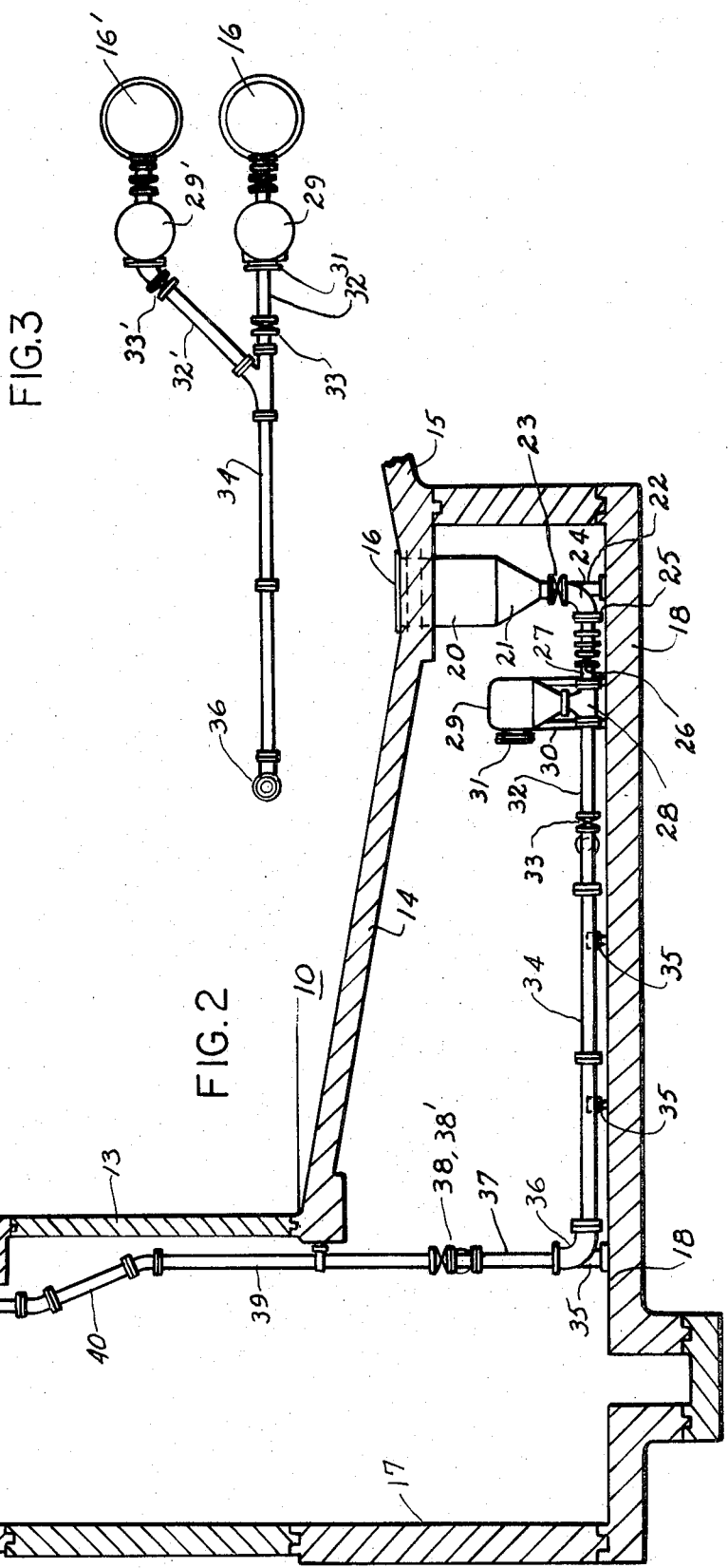

3,844,945

MOVEMENT OF ALUM SLUDGE

BACKGROUND OF THE INVENTION

In many operations, particularly in water purification, the problem of clarification of large volumes of water exists and it is accomplished by collecting the water in very large tanks, generally concrete tanks, which will be fifteen or more feet deep and, possibly, as many as thirty to one hundred feet in diameter, generally round clarifiers. To clarify drinking water in such subreservoirs, water is treated with alum to induce hydrolysis to aluminum hydroxide which forms a gelatinous precipitate, which is allowed to settle and the clarified water utilized in the local system. With operations on such a large scale there is, of course, the problem of alum sludge disposal, and slum sludge removal from the tank even before disposal can be arranged. At the other end of the water utilization scale there is clarification of sewage, which can follow more or less the same technique, to create a clear supernatant water and a sludge to be drawn off and discharged. Generally the installations involving drinking water will involve a number of such settling tanks which are used on a time cycle; that is, a tank of clarified water is consumed while other tanks are in various stages of clarification and removal of sludge. Generally any technique which can assist in the removal and disposal of sludge is of use and, accordingly, it is a basic object of this invention to provide a means forming part of apparatus for collecting the sludge and pneumatically removing it to a disposal area.

DETAILED DESCRIPTION OF THE INVENTION

The invention, accordingly, is in the pneumatic hydraulic installation which is built under and around a sludge settling tank, which combination comprises a sludge collector and means for isolating said sludge collector, conduit from said collector to an ejector, means to isolate the ejector, and conduit from said ejector to a point up at the edge of the tank and directed to a disposal vehicle or area. The device is repeated so that the collector and ejector form a dual air system for discharging into a conduit and the invention, accordingly, is in the elements and combinations of elements and features of construction of the device as related to a hydraulic sludge settling tank.

The details of the construction of the device will be better understood by reference to the drawings in which, FIG. 1 is a generalized representation of a sludge settling tank;

FIG. 2 is an enlarged partial section through the middle of such a tank showing the tank in the arrangement of sludge collector, ejector, and conduit under the tank and up the side wall thereof;

FIG. 3 is a top elevation of the discharge conduit installation under the tank.

Figure 4:
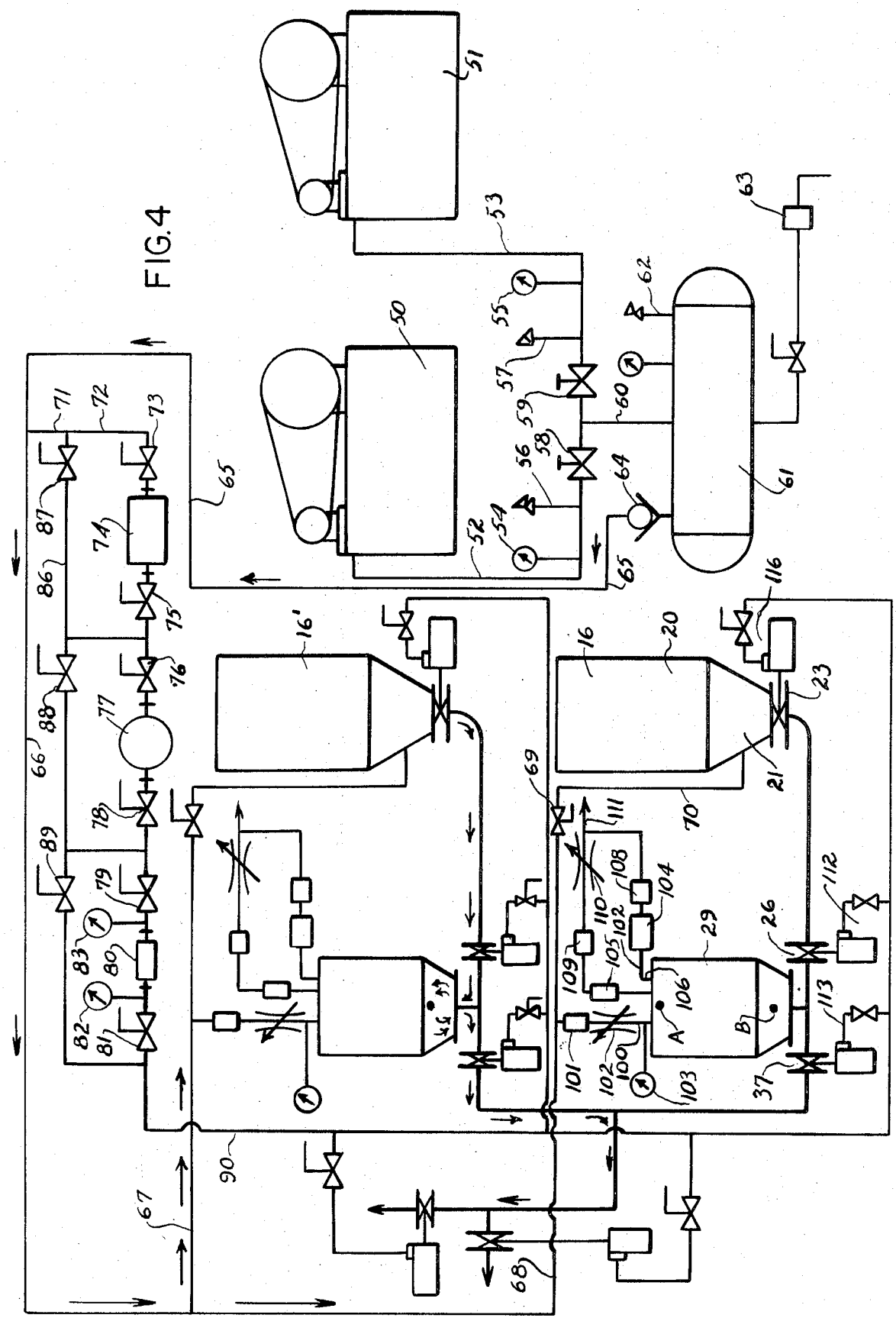
FIG. 4 is a flow diagram.

Referring to FIG. 1 it will be apparent that the tank is generally round and has a sloped bottom construction and, for our purposes, the bottom generally slopes to an inverted conical peak for the purposes of the settling operation. As indicated these tanks are made to hold many thousands of gallons of water and a typical moderate sized installation would involve a tank about one hundred feet in diameter. In a water purification system for a community the number of said such settling tanks will of course depend on the cycle which is established and the size of the community.

Referring now to FIG. 2, 10 represents the tank, in partial section, having side walls 11, 12, 13 which represents a typical decked side wall, with conical sloping botton, 14, 15 sloping to central discharge level 16. Exterior to the tank itself is the side wall 17 and associated with it is the pit bottom 18. Generally the bottom 18 will be about 10 feet below the lowest point of the bottom 14. These tanks are generally partially or mostly underground so that the ground level on the outside side wall 17 can be anywhere between the level 18 and the upper edge of the wall 11.

Thus there is formed around the side and under the tank space within which operators can function and within which plumbing can be installed and which also permits access to such installation.

In FIG. 2 our installation is shown as consisting of the settling vessel 20, or settling collector 20, having conical bottom 21, mounted at the low point 16 of the bottom of the tank. It is supported by a stand 22, fitted with a valve 23, elbow 24, with appropriate flange 25, and valve 26, connected to conduit 27, leading to tee 28 and to ejector 29, which is mounted on its stand 30. Ejector 29 also is equipped with manhole 31 to provide access thereto. Discharge from ejector 29 is via conduit 32, through valve 33, to conduit 34, which is supported at appropriate intervals on saddles 35, leading to elbow 36, conduit 37, valve 38, and further extensions of conduit 39, with supports and the like through conduit 40, 41, and ultimately through elbow 42, discharge length, and final outlet 44.

Paralleling this discharge unit is the second one shown in FIG. 3 wherein corresponding parts are shown with corresponding numbers and for emphasis to show the twin installation the corresponding numbers are primed. Connection is made from discharge unit 29' through conduit 32', valve 33' and from that point all discharge is through a single line.

The two units are thus separately plumbed in, connecting to a common discharge unit and provide for alternating discharge.

In FIG. 4 I have illustrated the type of control that can be used. In response to the system of operation the sludge collector requires only a means for sensing two levels and this can be done by means of pressure responsive relays or by means of floats or electrical level indicator system. In both systems the arrangement is made the same so that the interconnection for feeding compressed air into one or the other as shown in FIG. 4 responds to the sensing of the sludge reaching the upper sensing elements.

The systems for collecting and draining the sludge as it is formed in the tanks, for simplicity, is shown in FIG. 4 laid out in some detail to indicate the manner in which the compressed air is directed into the plumbing under the purification tanks to assist in the discharging. For simplicity in identification, the hoppers, the ejectors, the pipe lines leading therefrom and all parts in common in the two systems carry the same numbers. Added to this is the diagram of the pneumatic control and discharge.

Thus referring to FIG. 4 the entire system for air control and pneumatic discharge of the accumulated sludge is shown more or less diagrammatically.

In the figure 50 and 51 represent a duplex air compressor supplying air by lines 52 and 53, with pressure gauges 54 and 55, relief valves 56 and 57, plug valves 58 and 59, in line 60 to reservoir tank 61 which is equipped with a relief valve 62 and automatic condensate trap 63. The compressed air tank 61 is connected via check valve 64 and line 65 to the dual controlled air conditioning system and motive air system wherein the motive air passes by line 66 to line 67 and 68 to be brought to the hoppers 16 and 16', its points of use. Line 68 passes through ball valve 69, line 70 to be connected to hopper 16 for supplying it with clearing air.

Referring back to the system commencing with line 65 and 66, line 71 divides to 72 to feed through valve 73, to feed through an air dryer 74 and then through valves 75 and 76 through filter 77 valve 78 and 79 and pressure regulator 80 with valve 81 and pressure gauges 82, 83 to provide cleaned, control air to line 90 which serves the knife valves controlling the flow of sludge from the hopper and ejector, respectively, by-pass line 86 with valves 87,88,89 provide by-pass around parts of the system.

Motive air passing by line 68 is made available to the ejector 29 through line 100, solenoid valve 101, and needle control valve 102, which is attached to ejector 29. With pressure gauge 103 also connected to ejector 29 are filters 104 and 105 connected by lines 106 and 107 to solenoid valves 108 and 109 to needle valve 110 for relief through line 111. In the ejector are level detectors that are low level probe 112 and high level probe 113 which are used to determine the level of sludge accumulation of the ejector, or the level of ejection from the ejector. Control air drives the ejector inlet gate valve 26 and the discharge gate valve 37 through solenoid controls and the control air supply line. Gate valve 23 via the hopper 20 is controlled by solenoid control 116. Ultimate discharge is via valves 33, 33', line 34 and valve 38 and 38' all solenoid controlled.

The operation of the system is as follows:

ALUM SLUDGE EJECTOR SYSTEM
SOLIDS FROM PURE WATER TREATMENT PLANT

System operation shall be the same for all specified methods of operations — automatic, manual, and continuous. Each ejector 29 and 29' has an independent control system housed in a single enclosure, completely interlocked to prevent the two ejectors from filling and discharging at the same time. At the start of a cycle, all the knife gate valves and air control valves would be closed. The following sequence would complete a cycle:

A. The ejector inlet gate valve 26 and the air vent valve 109 will open, allowing sludge to enter the ejector 29 at a controlled rate by monitoring the air escaping from the top of the ejector through adjustable air regulator or need valve 110.

B. When the sludge level reaches the high level probe A, the inlet knife gate 26 and ejector air vent valve 109 close. Limit switches indicate fully closed conditions.

C. The discharge knife gate valve 37 and the compressed air inlet valve 101 will open, allowing compressed air to enter the top of the ejector 29 at the predetermined rate controlled by either air volume or air pressure by means of control valve or regulator 102.

The air receiver 61 pressure at this stage should have sufficient pressure, otherwise the inlet air valve 101 and knife gate valve 37 would stay closed.

D. The sludge will discharge at a regulated rate until the ejector 29 empties to the low level probe B; then the compressed air inlet valve 101 and the knife gate 37 will close. The ejector air discharge line 106 would also open at this time to insure release of all compressed air in the ejectors.

E. All conditions have now returned to the original starting cycle status.

F. Limit switches shall be provided to indicate open and closed position of knife gate valves 37,26,23, and also to indicate the critical position of respective air control valves 101, 109, 108. Subsequent operations will not occur unless cleared by signals from control switches. The control panel will be equipped with lights indicating the status of the system on a graphic display. An audible alarm can be provided to indicate malfunctions in the cycle and also to indicate an over-fill of sludge in the ejector.

ALUM SLUDGE EJECTOR SYSTEM
SOLIDS FROM PURE WATER TREATMENT PLANT

Controls should be designed for automatic, manual and continuous operation. Automatic operation should have a time clock for each ejector, adjustable for 4 minutes to 20 hours in 1 minute intervals. The ejector can be set to fill and discharge on an automatic interval from this time clock setting. In addition a counter circuit will be provided to allow a predetermined number of ejections at the time clock interval before automatically shutting off. Manual operation should allow a single ejection to be initiated by an operator even if the ejector is only partially filled. In the continuous mode of operation the ejectors should operate on a 2 minute cycle, or less, depending on actual conditions, and alternately eject sludge regardless of sludge level in the ejectors.

What is claimed is:

1. In a sludge movement system from an aqueous system for the collecting of sludge which comprises
a settling tank,
the improvement, comprising,
receiver for sludge in the bottom of said settling tank conduit means communicating said receiver to a discharge unit
a valve means for closing the conduit therebetween valve means beyond the discharge unit constituting a means for isolating it,
a duplication of said system in parallel therewith the discharging into a common conduit,
means in said discharge unit to sense a low and a high level of aqueous sludge; therein,
said high level sensing means being responsive to admit compressed air and to open valves permitting pneumatic discharge of sludge from said discharge unit and
at the same time means in the other unit response to low level to close its discharge valve and air valves to isolate it from said pneumatic discharge system.

2. A system in accordance with claim 1, said discharge units being pressure responsive.

3. A system in accordance with claim 1, wherein the sensor in said discharge unit is an electrical level sensor.

4. A system in accordance with claim 1, wherein the pressure of air employed in said system for discharge of the sludge is in the order of 10 to 100 pounds, per square inch.

5. The method of controlling the drainage and removal of alum sludge from water purification systems which comprises
- accumulating sludge in a vessel connected to the bottom of said sludge settling tank
- closing said vessel and simultaneously opening a second like vessel
- opening a passage from said first vessel to an ejector
- accumulating said sludge in said ejector
- closing said ejector to isolate it from said sludge accumulator and
- pneumatically ejecting sludge from said ejector out from the system while simultaneously operating a parallel system of accumulator and ejector to accumulate and eject sludge in a cycle out of phase from the first.

* * * * *